(12) United States Patent
Matsumoto

(10) Patent No.: US 8,187,738 B2
(45) Date of Patent: May 29, 2012

(54) SPIRALLY-ROLLED ELECTRODES WITH SEPARATOR AND THE BATTERIES THEREWITH

(76) Inventor: Isao Matsumoto, Osaka (JP)

( * ) Notice: Subject to any disclaimer, the term of this patent is extended or adjusted under 35 U.S.C. 154(b) by 1269 days.

(21) Appl. No.: 11/500,196

(22) Filed: Aug. 7, 2006

(65) Prior Publication Data

US 2006/0269833 A1    Nov. 30, 2006

Related U.S. Application Data

(63) Continuation of application No. 09/866,180, filed on May 25, 2001, now Pat. No. 7,087,345.

(30) Foreign Application Priority Data

Oct. 26, 2000  (JP) ................................. 2000-327215

(51) Int. Cl.
  *H01M 4/00* (2006.01)
  *H01M 6/10* (2006.01)
  *H01M 6/00* (2006.01)
  *H01M 10/00* (2006.01)
(52) U.S. Cl. ........................... 429/94; 429/128; 429/122
(58) Field of Classification Search ............... 429/94, 429/164, 223, 128; 29/623.1–623.5
  See application file for complete search history.

(56) References Cited

U.S. PATENT DOCUMENTS

| | | | |
|---|---|---|---|
| 5,534,369 A * | 7/1996 | Nagaura | 429/161 |
| 5,840,441 A | 11/1998 | Hirofumi et al. | |
| 6,235,426 B1 | 5/2001 | Yanai et al. | |
| 6,258,487 B1 * | 7/2001 | Kitoh et al. | 429/233 |
| 6,284,405 B2 | 9/2001 | Kaido et al. | |
| 6,300,002 B1 | 10/2001 | Webb et al. | |
| 6,458,485 B2 | 10/2002 | Yanai et al. | |
| 2003/0031929 A1* | 2/2003 | Kato et al. | 429/223 |

FOREIGN PATENT DOCUMENTS

| | | |
|---|---|---|
| EP | 814525 A2 * | 12/1997 |
| JP | 60-180058 | 9/1985 |
| JP | 62-177869 | 4/1987 |
| JP | 2-87474 | 3/1990 |
| JP | 4-26071 | 1/1992 |
| JP | 6-333542 | 12/1994 |
| JP | 8-185885 | 7/1996 |
| JP | 10-144340 | 5/1998 |
| JP | 10-247493 | 9/1998 |

(Continued)

OTHER PUBLICATIONS

Abstract in English of EP 814525.*

(Continued)

*Primary Examiner* — Barbara Gilliam
*Assistant Examiner* — Claire L Roe
(74) *Attorney, Agent, or Firm* — Merchant & Gould P.C.

(57) ABSTRACT

Spirally-rolled electrodes for batteries wherein the electrodes having a concentric circle shape or an elliptic shape with positive electrode and negative electrode wound spirally via a separator therebetween has the characteristics as below:

(1) the positive electrode and/or negative electrode consist of the combinations of several electrode plates;
(2) each of the combinations in the positive electrode and/or the negative electrode so includes that the total amount of the active material or pseudo-active material which are the main materials for the electrode is substantially constant and;
(3) each electrode plate in the electrode including plural electrodes is wound in series with an interval therebetween.

9 Claims, 9 Drawing Sheets

FOREIGN PATENT DOCUMENTS

| | | |
|---|---|---|
| JP | 2000-30673 | 1/2000 |
| JP | 2000-149907 | 5/2000 |

OTHER PUBLICATIONS

Ikoma et al., "Self-Discharge Mechanism of Sealed-Type Nickel/Metal-Hydride Batter." *Journal of the Electrochemical Society*, vol. 143, No. 6. Jun. 1996.

Matsumoto et al., "Ni-Fe Battery." extended abstract from ECS Detroit Meeting. 1982.

Ikoma et al., "Study on Self-Discharge of a Metal Hydride Rechargeable Battery System Employing $MmNi_{5-x}M_x$ Alloy." extended abstract from 174th Chicago (Fall) Meeting. 1988.

Yuasa et al., "Study on a Charge Characteristics of a Nickel/Hydride Battery System." extended abstract from 178th Seattle (Fall) Meeting. 1990.

Fujiwara et al., "Development of a Hydrogen Absorbing Alloy for the Negative Electrode of a Sealed Nickel-Hydride Battery System." extended abstract from 180th Phoenix (Fall) Meeting. 1991.

Matsumoto et al., "A Sealed Ni/MH Battery System for EV." extended abstract from 183rd Honolulu (Spring) Meeting. 1993.

Matsumoto et al., "Foamed Nickel Positive Electrode for a High Performance Cylindrical Ni-Cd Battery." *Power Sources 12*, 1988. pp. 203-220.

Ogawa et al., "Metal Hydride Electrode for High Energy Density Sealed Nickel-Metal Hydride Battery." *Power Sources 12*, 1988. pp. 393-410.

\* cited by examiner (a)

(b)

(c)

(d)

SPIRALLY-ROLLED ELECTRODES WITH SEPARATOR AND THE BATTERIES THEREWITH

This application is a Continuation of application Ser. No. 09/866,180, filed May 25, 2001, and which application(s) are incorporated herein by reference.

FIELD OF THE INVENTION

The present invention relates to secondary batteries employing a spirally-rolled electrodes with separator, comprising a concentric circle shape or an elliptic shape in cross section. Particularly, the invention relates to the reduction in distribution of capacities and the improvement in the cycle-life on sealed cylindrical batteries or sealed prismatic batteries.

BACKGROUND OF THE INVENTION

In recent years, in relatively small size batteries except for currently used dry cells, button-type cells, and coin-type cells, a spirally-rolled electrodes with separator enabling the high-rate discharge by expanding the surface area of both positive and negative electrodes is often employed as a means to construct electrodes, regardless of whether the batteries are primary or secondary.

However, since a relatively high-rate discharge and rapid rechargeability are required at the same time in battery market generally, most of the secondary batteries are employing the construction of spirally-rolled electrodes. Therefore, the way to comprise this construction is employed for most sealed cylindrical batteries or sealed prismatic batteries of nickel-cadmium batteries (Ni/Cd batteries), nickel-metal hydride batteries (Ni/MH batteries), and lithium ion batteries (Li-ion batteries) which represent secondary batteries. In other explanation, this spirally-rolled electrodes are employed for over 55% of the total battery production in currency in Japan. Therefore, the explanation goes ahead focusing sealed small size secondary batteries as an example.

With many battery systems selected naturally, by around 1990, the secondary batteries with the industrial production scale have been limited to lead acid batteries and Ni/Cd batteries. Particularly, the latter battery systems have remarkably expanded the market with the rapid, widespread use of the portable electronic devices including CDs and camcorders in 1980s, by being used as a power source. The main reason for this is that Ni/Cd batteries have higher energy density than lead acid batteries, which means that the former is more suitable for small-size and lightweight.

However, with the advent of 1990's, subsequent to the Ni/MH batteries with high volumetric energy density, Li-ion batteries with less weight have been developed, both of which have come to enter the market of Ni/Cd batteries. As for the shape of the battery systems, in the case of Ni/MH batteries, small size sealed cylindrical batteries are mainly used as in the case of Ni/Cd batteries. In Li-ion batteries, both small size sealed cylindrical batteries and sealed prismatic batteries are used.

In addition to the aforementioned purposes, Ni/MH batteries with larger size than the batteries for the said purposes, yet still classified to small size sealed cylindrical types, have come to mainly be used with the expansion of the power source market including hybrid electric vehicles (HEVs), electric-assisted bicycles, and the like.

As for the structure of the electrodes in these batteries, sealed cylindrical batteries for Ni/Cd batteries, Ni/MH batteries and Li-ion batteries are basically the same. It is the structure of electrodes wherein a positive electrode with a thin sheet of a rectangular plate and a negative electrode with a thin sheet of a rectangular plate are wound spirally depicting a substantially concentric circles with a separator made of a synthetic resin therebetween.

Further, although sealed prismatic batteries of Li-ion batteries have basically the same structure of electrodes with a spiral shape, the spirally-rolled electrodes with separator have nearly a flat elliptical shape, instead of a concentric shape. The said electrodes are inserted into the prismatic case with one side closed.

For information, both sealed prismatic Ni/Cd batteries and Ni/MH batteries employ the structure that several positive electrode plates and negative electrode plates are stacked alternately with a separator. However, this type has the low market share at present. In other words, regardless of the battery systems, the spiral type is the main structure of their electrodes in small size batteries.

To explain the prior art of this structure of spirally-rolled electrodes more specifically, a sealed cylindrical Ni-MH battery system is focused as an example.

Ni/MH batteries are such battery systems wherein nickel oxide powder (mainly oxy-nickel hydride) is used as the positive electrode material, and hydrogen absorbing alloy such as MmNi5 alloy system is used in the negative electrode as a pseudo-active material respectively, whose battery voltage per cell is about 1.2V. The pseudo-active material used in the present invention is the material that is capable of absorbing or desorbing the active material including hydrogen or lithium during an electrochemical reaction. The active material that is occuluded in pseudo-active material is desorbed during the discharging, and is absorbed during the charging, as an active material or a compound of the active material.

These active materials or pseudo-active materials are filled in the three dimensional substrate or coated on the two dimensional substrate with a conductive material, a binder and the like. As required, the substrate that is filled in or coated on may be pressed, which is the thin electrode for the battery system.

The electrodes are obtained by winding spirally with the positive electrode and the negative electrode interposing the non-woven hydrophilic polyolefin separator therebetween. Subsequently, the electrodes are inserted into the cylindrical metal case with one side closed, in which alkaline electrolyte is poured, thereafter sealed by the cap, acting as a thin plate positive electrode terminal and safety vent, with a gasket made of synthetic resin, thereby obtaining a battery. Here, in this battery, like in general Ni/Cd batteries and Li-ion batteries, the battery capacity is regulated by the charging and discharging capacity of the positive electrode. In other words, the distribution of the battery capacity practically corresponds to the distribution of the weight of active materials filled in or coated on the positive electrode substrate, although there do exist some errors due to the distribution of the utilization of active materials.

As aforementioned, since small size secondary batteries have originally been used for high-rate discharge, the structure of the spirally-rolled electrodes has been required: Further, in recent years, as for Ni/MH batteries, with the development to the market of power use which requires further high-rate discharge performance, the structure of the spiral electrode group using thinner and longer electrodes than the conventional electrodes has been drawing attention.

In addition, for this purpose, since the battery is used at a high voltage of several hundred volts, much higher voltage than for the consumer use, in the batteries with 1.2 V systems, many cells are used in series. For example, in the batteries for HEVs, which have been mass-produced recently, 240 cells or 120 cells of D-size Ni/MH batteries are used in series.

In the said case, batteries with a small capacity are susceptible to the damage of overdischarge or overcharge as well as limit of the capacity of whole battery system in series, which sometimes makes the whole battery capacity low, and shortens the cycle life as well. It can be said that this is a fatal problem, particularly for this purpose. Therefore, to keep the distribution of the battery capacities narrow has become a more significant issue than ever for obtaining the reliability of the power source.

Therefore, in sealed cylindrical Ni/MH batteries, particularly in the positive electrode which determines the battery capacity, the following three studies for the improvement have been conducted for reducing the distribution of the capacities among batteries.

1. To improve the technique or apparatus to reduce the distribution of filling or coating of the active material powder.
2. To measure the weight of all the electrodes and select such electrodes as having nearly the same weight.
3. To measure the discharging capacities of all the batteries and select such batteries as having nearly the same discharging amount.

As aforementioned, since higher-rate discharge is necessary for power use compared with the consumer use, thinner electrodes are used usually. For this, due to the expansion of electrodes caused by repeating charge and discharge cycles, a part of the electrode is prone to deform concentric circle shape or to deform flat elliptical shape of the spirally-rolled electrodes. And new risk has emerged that, under some circumstances, the microscopic short circuit may occur between the both electrodes with a separator broken through by a deformed portion of the electrode. Here, this risk is the phenomenon also recognized in the Li-ion batteries that already have developed the thin electrodes.

In other words, in Ni/MH batteries or Li-ion batteries using the structure of the spirally-rolled electrodes, when a longer and thinner electrodes which are weaker mechanically than the conventional electrodes are used as a means to make batteries of high-power, the partial distortion from concentric circle or original ellipse of the spirally-rolled electrodes becomes remarkable caused by the expansion of the electrode with the increased charge and discharge cycles, and under some circumstances, the batteries often have the risk of microscopic short circuit.

By the improved measures mentioned in the said study 1, aiming to reduce the distribution of the said battery capacity, a certain amount of the active material powder filled or coated per area whose main material is $Ni(OH)_2$ can be achieved with considerable progress. For example, the original variation of ±7~10% is reduced to around ±3~5%.

However, it is not enough for the use of a power source for HEVs which uses a few hundred cells in series.

By the improved measures mentioned in the said study 2, by providing the ranking by weight, the amount of active material filled in a certain weight range can be known, and the battery capacities can also be known in a certain range by using the electrodes in the same class. However, the capacity distribution of whole cells cannot be reduced.

The improved measures mentioned in the said study 3 has the similar concept to that mentioned in the said study 2 and is more accurate since the battery capacity is measured directly in the improved measures mentioned in the said study 3. However, in order to obtain accurate capacity of the battery, several cycles of the charge and discharge are required, which is complicated and troublesome. Further, the capacity distribution cannot be reduced as a whole cells as in the improvement measures mentioned in the said study 2. In addition, as for the prevention of microscopic short circuit, no new measures for solution have yet to be reported.

SUMMARY OF THE INVENTION

The present invention is the invention to provide spirally-rolled electrodes having a concentric circle shape or an elliptic shape for batteries, wherein a positive electrode and a negative electrode wound spirally interposing a separator therebetween has the characteristics wherein (1) the said positive electrode and/or negative electrode comprise with the combinations of several electrode plates; (2) each of the said combinations in the said positive electrode and/or the said negative electrode comprises that the total amount of the active materials or pseudo-active materials which are the main materials is substantially constant and; (3) each electrode plate in the electrode comprising several electrodes is wound in series with a space therebetween.

Taking sealed cylindrical Ni/MH batteries as an example for further explanation, at least the positive electrode capacity determining the capacity of the battery employs the constructing method of using several positive electrode plates of the same surface area in series. Further in this method, by adjusting the total weight of the several positive electrode plates to the same level and by keeping the amount of the active materials of each positive electrode in each battery the same, the distribution of battery capacity is reduced. Furthermore, by keeping the proper distance among several positive electrode plates, the deformation of electrode group due to the expansion caused by the repeated charge and discharge is absorbed.

By this, the distribution of the capacities among batteries can be greatly reduced, and at the same time, sealed cylindrical Ni/MH batteries hard to generate microscopic short circuit are obtained.

In addition, by using the battery case with thin side walls, whose ratio ($t_2/t_1$) of the thickness at the bottom ($t_2$) to the thickness at the side wall ($t_1$) is not less than 1.5 together with the said spirally-rolled electrodes, remarkable effect is brought about in realizing further lightweight and large capacity, particularly when applying to the power source for HEV and EV use.

Here, by being able to reduce the capacity distribution, an extra electrode materials in the negative electrode to keep a certain capacity balance can be decreased, which leads to the Ni/MH batteries with lighter weight or higher capacity density.

The object of the present invention is therefore to provide secondary batteries with spirally-rolled electrodes with separator that can reduce the distribution of battery capacities and reduce the microscopic short circuit as well. Accordingly, the batteries provided with the said electrodes, wherein the power source for auto-mobile use including hybrid electric vehicles (HEVs) with a few hundreds of batteries in series has high reliability. In other words, the object of the present invention is to provide secondary batteries with very little capacity distribution and long cycle life.

DESCRIPTION OF THE PREFERRED EMBODIMENTS

Although the present invention is not specifically limited to Ni/MH batteries, taking sealed cylindrical Ni/MH batteries as an example, the embodiment of the present invention is to be explained referring to the figures.

Figure 5:
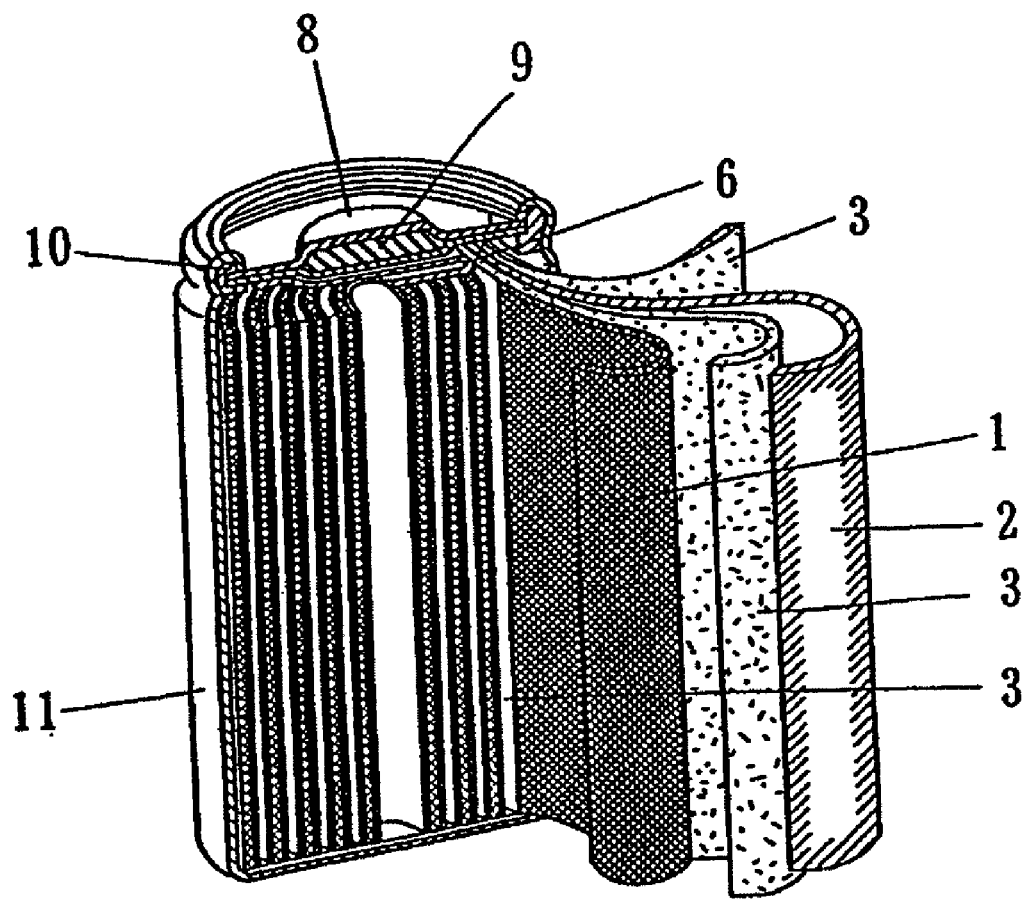
FIG. 5 shows a structure diagram of spirally-rolled electrodes for sealed cylindrical Ni/MH batteries by an embodiment of the present invention.

In sealed cylindrical Ni/MH batteries as shown in the FIG. 5, the plate-typed positive electrode 1 with less than 1 mm thick and the plate-typed negative electrode 2 which is thinner than the positive electrode 1 are wound spirally interposing a non-woven separator 3 made of synthetic resin fiber and are inserted into a metallic case 11.

Next, after pouring alkaline electrolyte, the spirally-rolled electrodes are sealed by a cap with a gasket 10. Here, this cap also plays a role of a positive terminal 8 equipped with a safety valve 9 so as to release the gas when internal pressure of the battery becomes abnormally high.

In general, the electrodes comprise one positive electrode, one negative electrode, and a separator. However, in the present invention, as shown in the FIGS. 1 and 2, two positive electrode plates 1-a and 1-b, and one or two negative electrode plates 2-a and/or 2-b, are wound spirally in series interposing a separator 3.

Prior to the construction of this electrodes, in each plate of the positive and/or negative electrode, whose weight is measured, two electrodes are so selected and combined that their weight be substantially constant, or close to the average weight value. Further, appropriate spaces y and x are provided between the two positive electrode plates composing the positive electrode and/or the two negative electrode plates composing the negative electrode as shown in the FIGS. 1 and 2. Here, for example, by weight ranking to 5 groups or more, substantially the constant weight is preferably within the range of ±1 wt %.

Since such positive and/or negative electrodes can be adjusted to have a weight of each electrode close to the average weight value, that is, since the total weight of the active materials and the pseudo-active materials can be adjusted to be substantially constant, the distribution capacities in a large number of each battery is made small.

In addition, as aforementioned, the expansion or extension of the electrode, due to the repeated charge and discharge, causes remarkable deformation in the spirally-rolled electrodes using the thin positive and negative electrode, which may lead to the microscopic short circuit under some circumstances. However, the spaces y and x provided between the electrode plates can absorb the said deformation, which greatly contributes to the reduction of microscopic short circuit.

Here, in the Li-ion battery employing the extremely thin positive and negative electrodes, the similar effect can be expected in the same theory.

In the above, sealed cylindrical Ni/MH batteries were taken as an example, and specifically, the explanation was made on a battery comprising, at least, two positive electrode plates. However, as aforementioned, the capacity of the positive electrode determining the battery capacity may solely have several plates, and both electrodes may comprise several sheets.

At least, each of their two corners of the said positive plates and/or the said negative plates is preferably chamfered and more preferably, every corner of electrode plates is chamfered. In the case where the two corners of the said electrode plates are chamfered, the two corners of the adjacent side of electrode plates with an appropriate space are preferably chamfered, though, of course, cutting the whole plate edge in a round manner is available. If the two corners of the several electrode plates are not chamfered, the electrode plate extends due to the repeated charge and discharge, leading to bite or break in the separator with the corner of the electrode plate. The said beveling is not specifically limited, but it is preferable to chamfer 1C, that is, to make the curvature radius 1 mm by a known method from the viewpoint of break prevention and easy processing.

For the same purpose, it may be available that the tip of the said plate is covered by a strip of the separator material.

As explained above, in each electrode plate of the electrode shown in the present invention, around one electrode plate and other electrode plates are wound spirally in series with a space in the direction of winding. In the said space should be provided a certain distance so that the electrode plate might not abut against electrode plate next to it or might not cause protuberance due to the extension caused by repeated charge and discharge. Since this space is determined depending on the materials of the active materials to be used, filling density, substrate strength, the length of the electrode plate in the direction of winding of the electrode plate, and the like, specifying the value is difficult. However, in the general case where the active materials expand 10 to 20%, the distance of the space may be around 1 to 5% of the length of the electrode plate. When the distance is narrower than 1%, it is not preferable because such deformation as having further protuberance after contacting with the adjacent electrode may occur, contributing the risk of microscopic short circuit. On the other hand, when the distance is wider than 5%, a problem of reduced battery capacity occurs due to the remarkable reduction of the active material amount. In sealed cylindrical Ni/MH batteries, it is preferable to have the said space of 1.0 to 5.0 mm when the positive and negative electrodes are thin nickel positive electrode and thin metal hydride negative electrode, respectively.

The positive and negative electrodes of the electrodes for batteries in the present invention are wound spirally having a concentric circle shape or an elliptic shape, which may be wound in a substantially concentric or elliptic way, and need not be wound in a perfectly concentric or elliptic shape.

In each electrode comprising plural electrode plates for batteries in the present invention, the combination may be such that the total weight of active materials or pseudo-active materials on positive or negative electrode is substantially constant and is not limited specifically in the case of the shapes of the identical electrode plate. It is preferable, however, that the area of electrode plates in each of the electrodes is identical. When each of the electrode plates has the identical area, since all the weight of the electrode plates is within the simple normal distribution, the screening combination of light weight plates and heavy weight plates becomes easier. On the other hand, if the areas are not identical, the realization of the uniform weight gets difficult because there are over two normal distributions.

The electrodes for batteries in the present invention are also spirally-rolled electrodes having a concentric circle shape or an elliptic shape with a thin nickel positive electrode and a thin metal hydride negative electrode which are wound spirally interposing a separator therebetween wherein:

(1) the said thin nickel positive electrode is the electrode around which two or more positive electrode plates are wound in series in order;

(2) the said thin metal hydride negative electrode is the electrode around which one or plural positive electrodes are wound in series in order;

(3) several electrode plates are so combined that the total amount of the active material or pseudo-active material is substantially constant in an electrode comprising several electrode plates;

(4) several electrode plates in an electrode comprising several electrodes are wound in series with a space therebetween and;

(5) the thickness of an electrode plate at the part of the start of winding is thinner than the thickness of an electrode plate at the part of the end in several electrode plates in an electrode comprising several electrode plates.

In the said embodiment in the electrodes for batteries of the present invention, that the thickness of an electrode at the side where the winding starts is thinner than the thickness of an electrode at the side where the winding ends enables to control the electrode crack which is likely to occur at the beginning of winding with small curvature radius.

A secondary battery of the present invention is also a battery wherein the said electrodes are inserted into a battery case and the positive electrode lead is connected to a lid by means of spot welding, or the like and the negative electrode is connected to the case, and then the said lid is caulked to the aperture part of the said battery case.

A secondary battery of the present invention can be obtained by inserting the said electrodes of the present invention into a container of a battery case of the desired external diameter size such as D, C, AA, AAA and AAAA, and any types of prismatic case.

As for a battery case in a secondary battery according to the present invention, in the case that the secondary battery of the present invention is used in the application where the capacity is enlarged and weight reduced in, for example, a battery for HEVs, it is preferable to use light weight battery case with a thinner side wall wherein the ratio ($t_2/t_1$) of the thickness ($t_2$) of the bottom to the thickness ($t_1$) of the side wall is 1.5 or more and, moreover, it is more preferable for the ratio ($t_2/t_1$) of the thickness ($t_2$) of the bottom to the thickness ($t_1$) of the side wall to be approximately 2.0 from the view point of extra strength against internal cell pressure of the side walls of the container and a secure crack prevention which might occur during the spot welding to the bottom. When a secondary battery according to the present invention is used in a battery for HEVs, or the like, the bottom of the battery case of the secondary battery is connected by welding directly, or with a metal connector, to the positive electrode terminal of another adjoining secondary battery depending on the using method. The said using method contributes to the prevention of transformation or dissolution at the bottom of the battery case. Therefore, since it is necessary that the bottom of the battery case withstand the spot welding with the connector which connects between cells, it is preferable to use the battery case whose bottom is thick enough to withstand the spot welding and to make the ratio ($t_2/t_1$) of the thickness ($t_2$) of the bottom to the thickness ($t_1$) of the side wall 1.5 or more. By using the said battery case, compared with conventional battery cases whose side wall and the bottom have the same thickness, it is possible to reduce the weight of the battery case by approximately 30% without changing the material. At the same time, since the inside volume increases, it is possible to realize the large capacity of the secondary battery. Here, the above described welding is carried out according to a well known welding method and is carried out within the range of 1000° C. to 3000° C. of the welding temperature at the spot welding part.

In a secondary battery according to the present invention, the use of usage for a battery case of AAAA size, whose ratio ($t_2/t_1$) of the thickness ($t_2$) of the bottom to the thickness ($t_1$) of the side wall is 1.5 or more, whose thickness of the bottom is approximately 0.2 mm, and whose thickness of the side walls is 0.1 mm ($t_2/t_1=1.82$), increases capacity of approximately 5%, comparing with the use of a battery case of the same material, of which the thickness of the bottom is approximately 0.2 mm and of which the thickness of the side walls is 0.2 mmm ($t_2/t_1=1$).

Though the material of the battery case in a secondary battery of the present invention is not particularly limited, it is preferable to use iron with nickel plating for an alkaline storage battery from the viewpoint of electrolyte-proof properties and it is preferable to use aluminum, or aluminum alloy, in addition to iron for a lithium secondary battery from the viewpoint of weight reduction.

Though the above described battery case can be manufactured by a well known method, such as by deep ironing process, it is preferable to manufacture by the drawing and ironing process at the same time in order to attain a thinner side wall and the ratio ($t_2/t_1$) of the thickness ($t_2$) of the bottom to the thickness ($t_1$) of the side wall is 1.5 or more. In case that the battery case is manufactured by deep ironing processing consisting of a great number of processing steps to move closer to the desired battery case structure, generally the thickness of the bottom and of the side walls become approximately equal, however, since drawing and ironing processing at the same time is a method for forming a cylindrical case 13 or a prismatic case with a bottom from a metal plate through extrusion by one revolution of the spindle, a battery case having a desired thickness of the side walls can be easily formed to gain the above described battery case by adjusting the gap between the spindle 12 and the mold 14 in FIG. 7.

Figure 8:
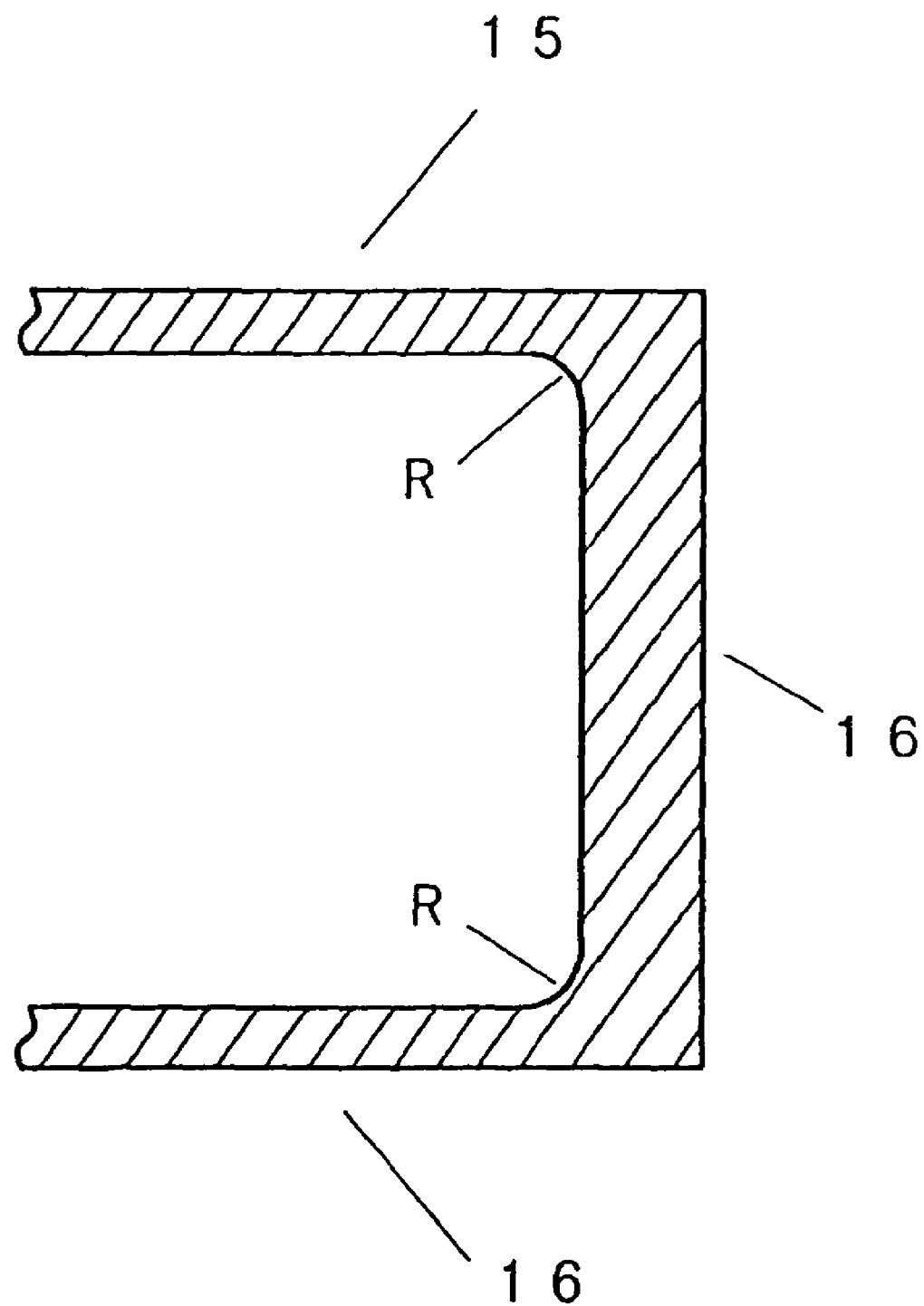
FIG. 8 shows an enlarged sectional view of the battery manufactured by a drawing and ironing step.
Figure 9:
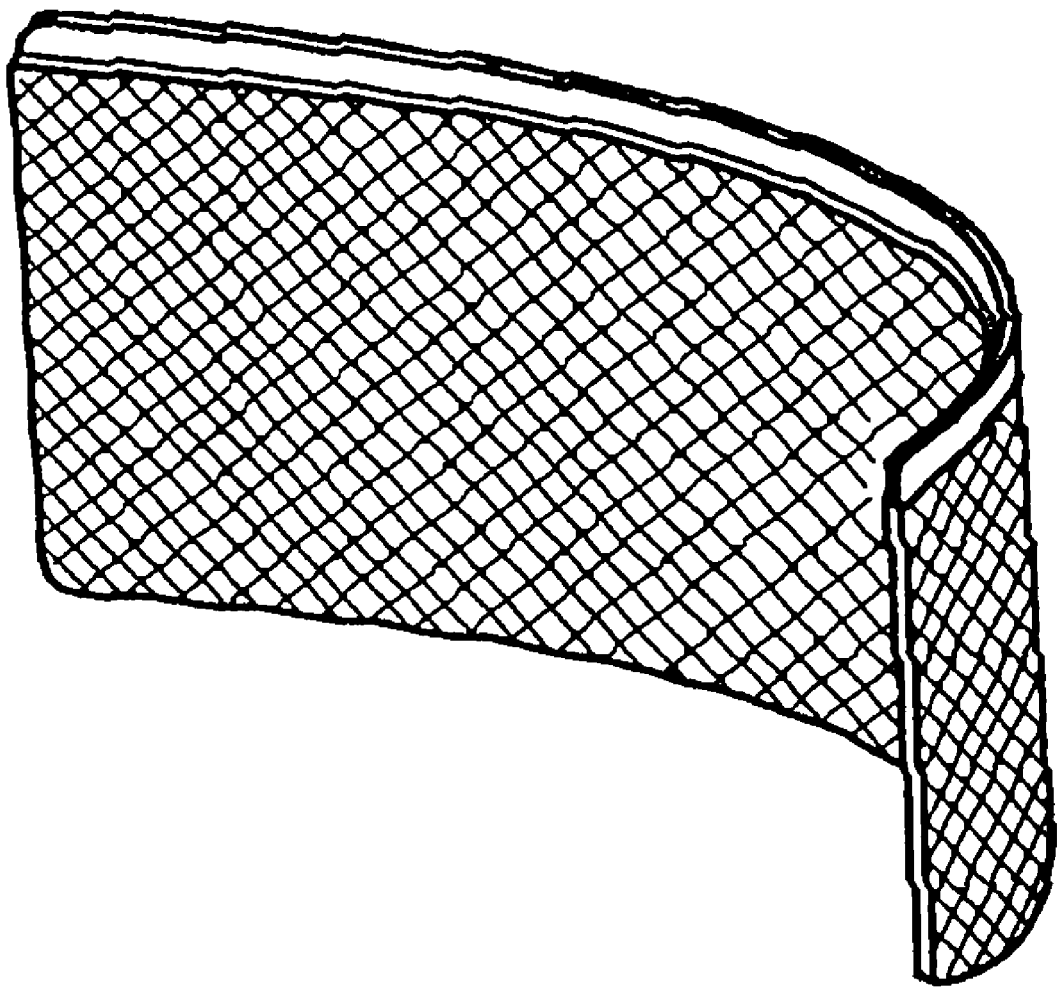
FIG. 9 shows an electrode plate having fillets of 1C in the corner.

In the battery case of a secondary battery according to the present invention, it is preferable that thicker part is provided along the border between the sidewalls 15 and the bottom 16 within the battery case in order to secure the mechanical strength. The said thicker part is the part indicated by R in FIG. 8. The forming of the battery case with the spindle having the rounded external periphery of the edge part can provide the battery case having the thicker part corresponding to the edge part of the spindle. It is possible to provide the mechanical strength with the battery case by using the spindle whose the edge part is rounded of diameter of 1 mm for a battery case of AA size without lowering the battery capacity.

Though a secondary battery according to the present invention can be made lighter in battery weight by employing the above described electrodes, a further lighter secondary battery can be provided by using said battery case of which the side walls are further thinner and of which the ratio ($t_2/t_1$) of the thickness ($t_2$) of the bottom to the thickness ($t_1$) of the side wall is 1.5 or more.

EXAMPLES

The specific examples are explained as below.

The Preparation Example of the Paste for Electrodes

The mixture of the active material is obtained by adding 3 parts by weight of cobalt oxide and 2 parts by weight of zinc oxide respectively to conventional spherical nickel hydride powder (100 parts by weight) on the market, wherein 1 wt % of cobalt and 3 wt % of zinc as an element are contained to form a solid solution. The active material paste is obtained by adding the solution to the said mixture by 25 wt % of the whole, wherein 0.5 wt % of carboxy methylcellulose and 0.1 wt % of polyvinyl alcohol are dissolved into water and blended, and by mixing the said mixture with the said solution added.

The Production Example of the Battery Case

Figure 7:
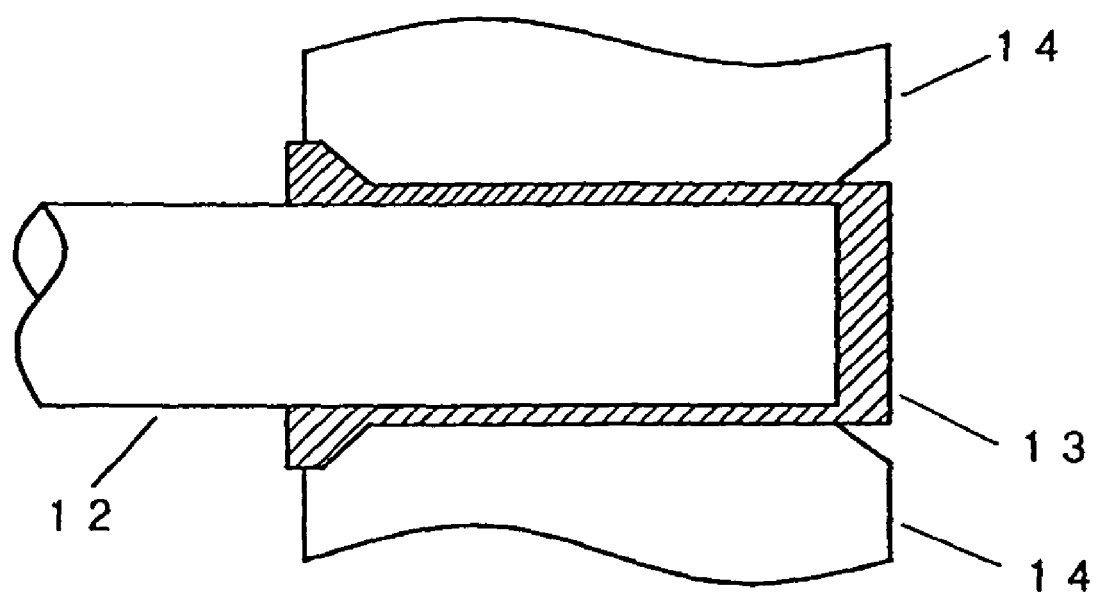
FIG. 7 shows a drawing and ironing step for a cell case.

As a production example 1, as shown in FIG. 7, a nickel plated steel plate (plating thickness of 1 μm) of the thickness of around 0.3 mm which is punched out into a circle submitted to one cycle of drawing and ironing process by spindle 12 which is known in the art so as to gain the formation of a cylindrical container 13 with a bottom. More concretely, as for the dimensions the outer diameter is 25 mm, the thickness of the side walls is 0.19 mm and the thickness of the bottom is 0.3 mm. Here, it is preferable to provide thicker parts R inside of the border part between the side walls and the bottom in order to prevent the physical strength of the border from being weakened.

As a production example 2, by adopting the same method as in a production example 1, except for using a nickel plated steel plate (plating thickness of 1 μm) of the thickness of around 0.25 mm which is punched out into a circle submitted to one cycle, cylindrical AA size battery case with a bottom was obtained. Here, more concretely, the dimensions of the outer diameter is 14 mm, the thickness of the side wall is 0.16 mm and the thickness of the bottom is 0.25 mm.

Example 1

Figure 3:
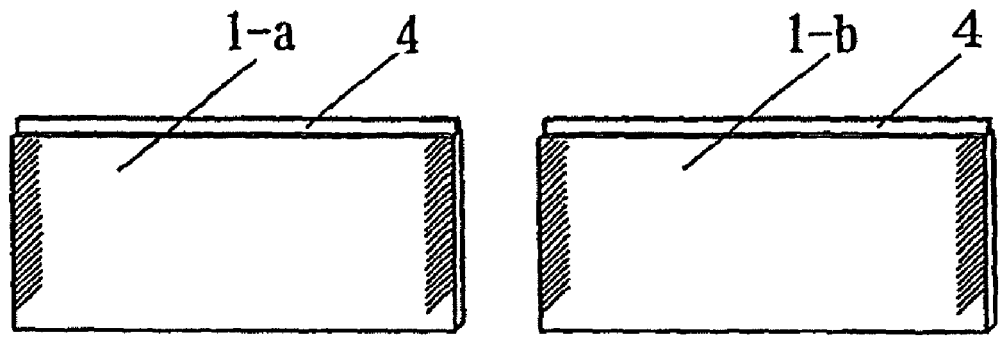
FIG. 3(a) shows a nickel positive electrode composed of two plates for sealed cylindrical Ni/MH batteries by an embodiment of the present invention.
FIG. 3(b) shows a nickel positive electrode composed of two plates for sealed cylindrical Ni/MH batteries by an embodiment of the present invention.
Figure 3:
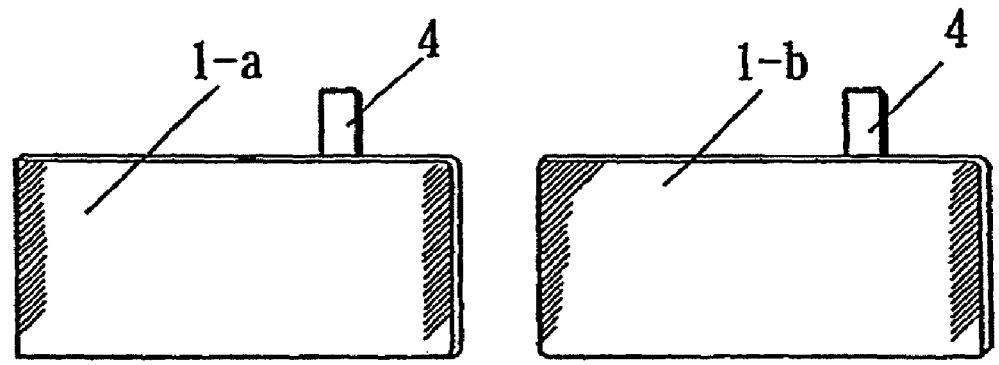

By filling the paste of the preparation example in the foamed nickel with nickel foil welded at one edge in the direction of the length beforehand and then by lightly pressing after drying the paste, several sheets of positive electrode plates with the thickness of 0.4 mm, the width of 40 mm and the length of 230 mm as shown in the FIG. 3(a) were obtained. Subsequently, all the weights of the positive electrode plates were measured and classified into 8 classes by weight, thereby obtaining the positive electrodes for batteries by selecting 2 plates so that the weight value of each plate might be close to the average weight value.

Figure 1:
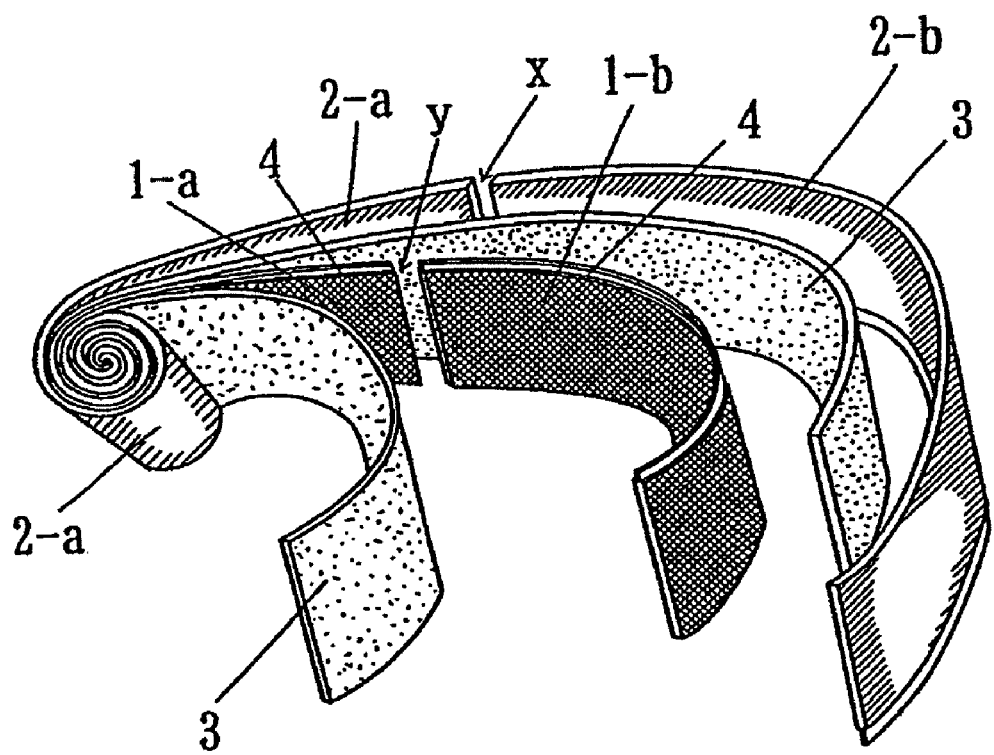
FIG. 1 shows a structure diagram of spirally-rolled electrodes for sealed cylindrical Ni/MH batteries by an embodiment of the present invention.
Figure 2:
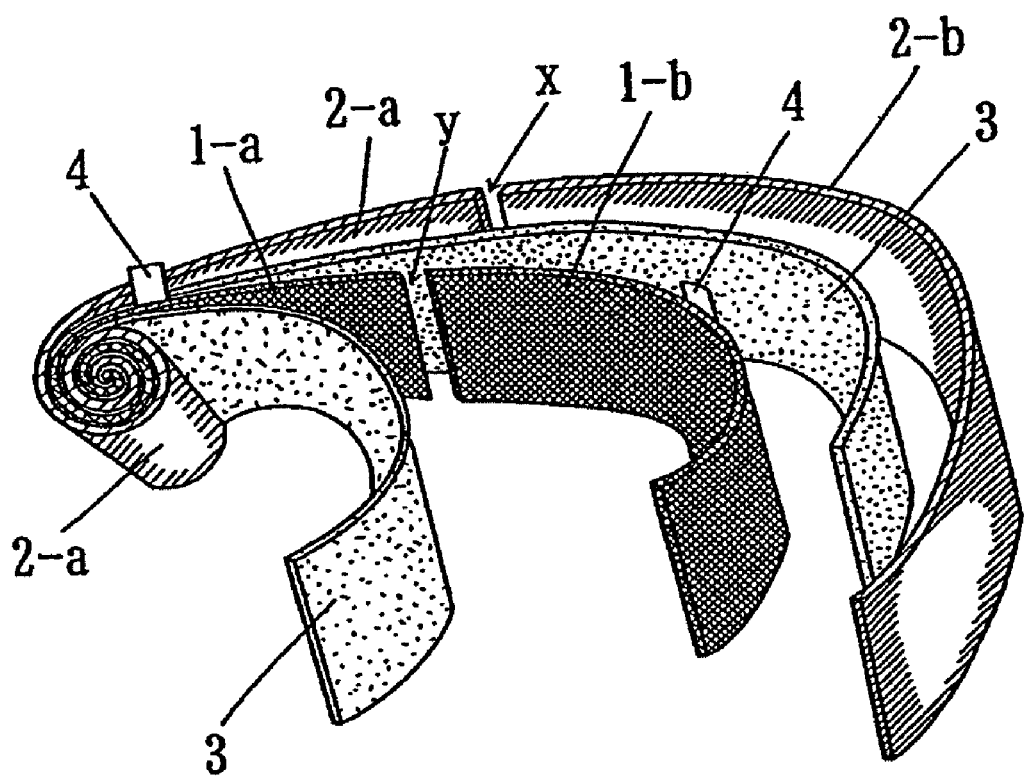
FIG. 2 shows a structure diagram of spirally-rolled electrodes for sealed cylindrical Ni/MH batteries by an embodiment of the present invention.
Figure 4:
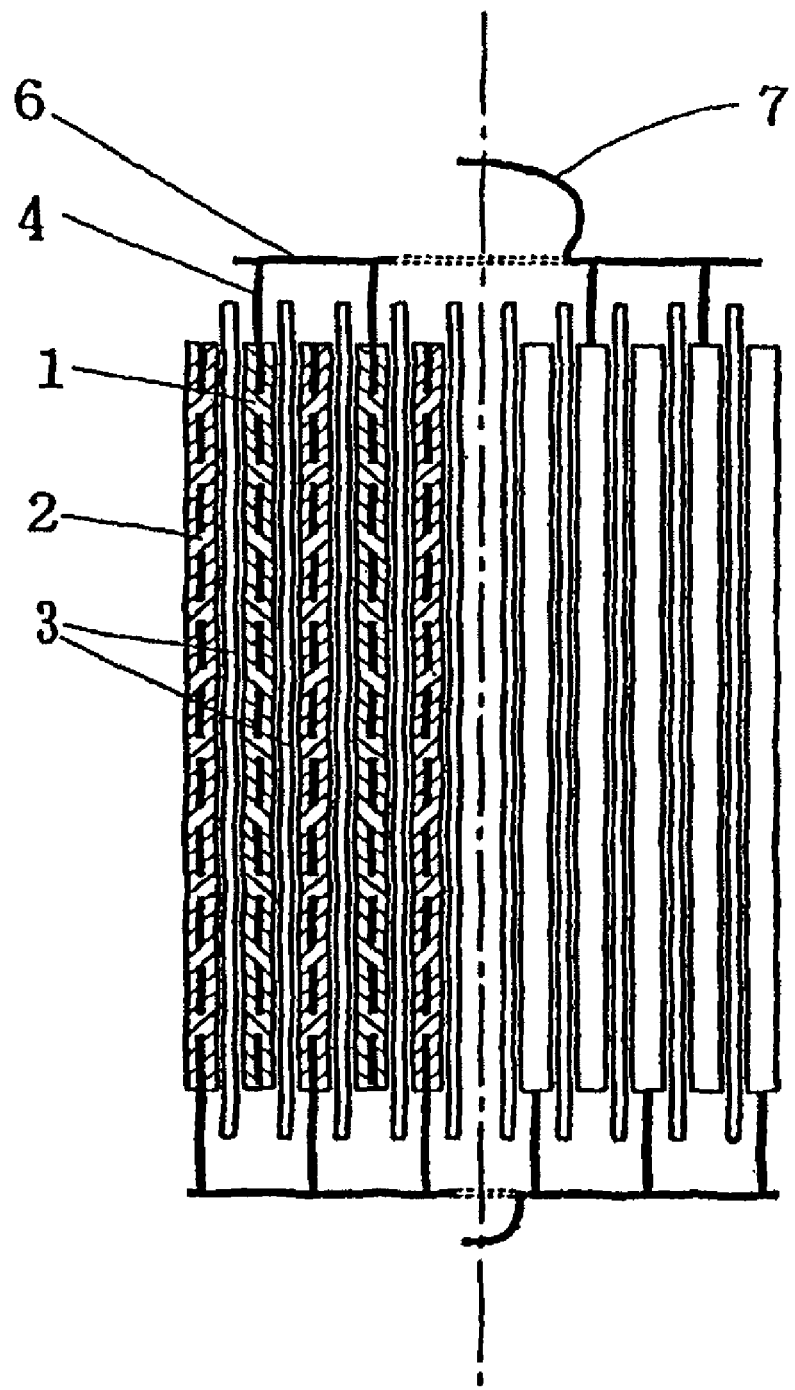
FIG. 4 shows a sectional view of spirally-rolled electrodes for sealed cylindrical Ni/MH batteries using a nickel positive electrode in FIG. 3(b) which is an embodiment of the present invention.

The spirally-rolled electrodes as shown in FIG. 1 constructed this positive electrode of two plates in series and a sheet of hydrogen absorbing alloy negative electrode with a thickness of 0.25 mm, a width of 40 mm, and a length of 580 mm using a generally used MmNi 5-type alloy with a hydrophilic non-woven separator made of polypropylene therebetween. At the time of winding, as shown in y in the figure, two sheets of positive electrode plates were constructed spirally with the space of 3 mm and the edge of the latter plates is covered by an extra separator strip. Here, in the FIG. 1, while a negative electrode is shown to comprise the two electrode plates, the present Example 1 shows that one negative electrode was used. As shown in the FIG. 4, the nickel foil 4 provided in the positive electrode 1 is not covered by the separator 3 and is welded to the doughnut-shaped metallic plate 6 with a lead terminal 7 welded to the cap is cut out. Therefore, two sheets of positive plates have a construction connected to the metallic plate 6 at the many welding points and the impedance is greatly reduced.

Here, all the weight distribution when 3000 sheets of positive electrode plates were manufactured 300 sheets of positive electrode by 10 times, was nearly normal, with a ±7% variation in the range of ±3 σ. Thereafter these plates were classified into 8 classes and among the positive electrodes combined by a couple to be closer to the average value, when the weight of 500 couples were measured, as shown in the FIG. 6(d), the distribution is within the range of ±1% from the average value.

Figure 6:
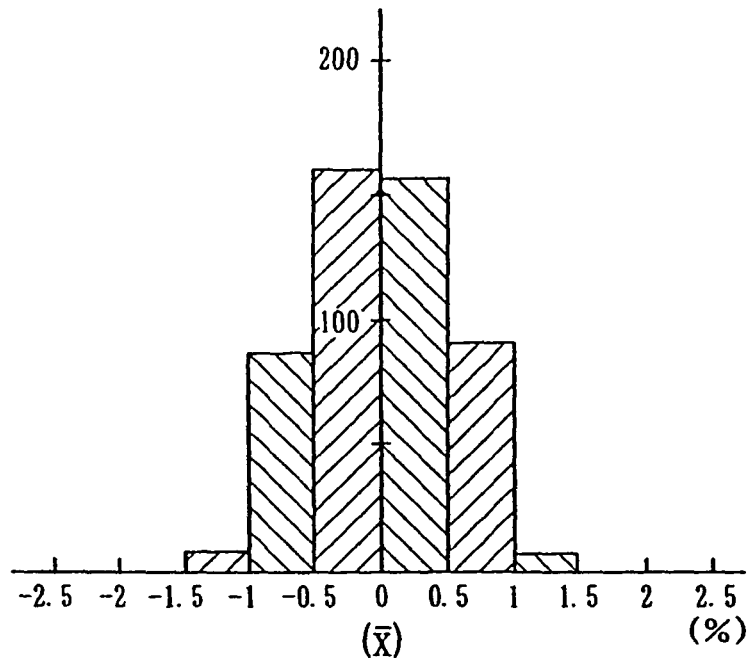
FIG. 6(c) shows a distribution diagram of discharge capacities of 500 cells of the battery in the Example.
FIG. 6(d) shows a distribution diagram of positive electrodes weight for 500 cells of the battery used in the Example.
Figure 6:
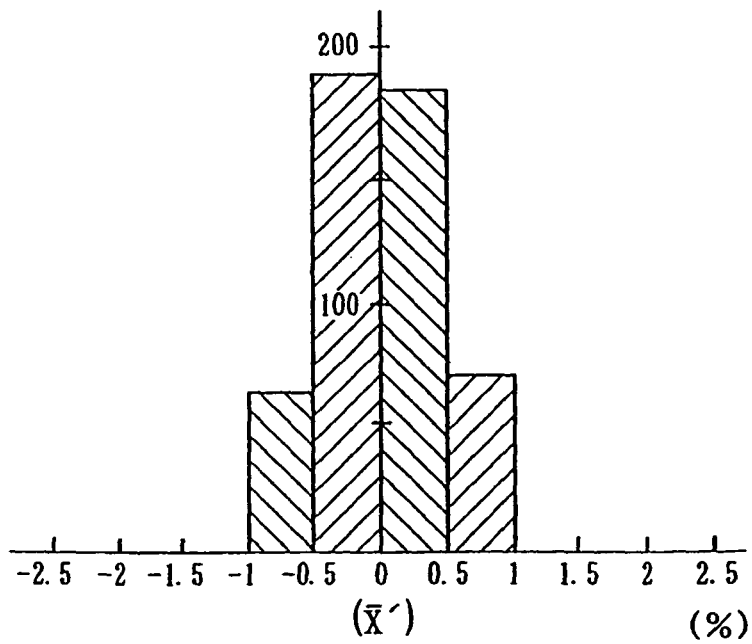

C-size sealed cylindrical Ni/MH batteries were prepared by inserting this spirally-rolled electrodes into the c-size case manufactured in the Example 1, thereafter pouring about 30 wt % of KOH solution in the case, which is then sealed. The distribution of the discharge capacity is shown in FIG. 6(c) when 500 cells of this c-size batteries were charged by 120% of 4500 mAh, the theoretical capacity of the positive electrode at 0.1 C, then discharged till 1.0 V at 0.5 C, further charged 0.5 C/120% and 2 cycles of discharge were repeated till 1.0 C/1.0 V. As a result, the battery capacity can be limited to within the range of ±1.5%. When the general batteries are used without using the two sheets of positive electrodes, since the variation is about ±8%, the variation is found to be extremely low.

In addition, as Comparative Example 1, the electrodes was constructed in the same manner as in the Example 1 except for making the space between the two positive electrodes 0.5 mm. As Comparative Example 2, the electrode group was constructed in the same manner as in the Example 1 except for making the space between the two positive electrodes 1 mm. Further, the electrode group was constructed in the same manner as in the Example 1 except for using a sheet of positive electrode.

As for electrode group in the Example 1 and Comparative Examples 1 to 3, these electrode groups were inserted into a C-size sealed cylindrical case for batteries, pouring about 30 wt % of KOH solution thereafter sealing, thereby obtaining a c-sized sealed cylindrical Ni/MH batteries. As for each 100 cells of the batteries using each spirally-rolled electrodes, the batteries were charged with 1C for 15 hours, and after the intermission of 1 hour, charge and discharge test was conducted repeating the cycle to discharge till 1.0 V to a set cycle.

The results were shown in the table 1 making the Example 1 "l" wherein the space between the positive electrode is 3 mm, making the Comparative Example 1 "m" wherein the space between the positive electrode is 0.5 mm, making the Comparative Example 2 "n" wherein the space between the positive electrode is 1 mm, making the Comparative Example 3 "o" wherein a sheet of the positive electrode is used. Here, in the column of the total number of short circuit in table 1, the numerator refers to the total number of short circuits in the each set cycle, while the denominator refers to the number of test cells in the cycle tests.

TABLE 1

| | The set cycle of the charge and discharge test | | | | | The total number |
|---|---|---|---|---|---|---|
| | 100 | 200 | 300 | 400 | 500 | fo short circuit |
| l | 0 | 0 | 0 | 0 | 0 | 0/500 |
| m | 0 | 0 | 0 | 0 | 1 | 1/500 |
| n | 1 | 2 | 1 | 4 | 8 | 16/500 |
| o | 1 | 1 | 3 | 6 | 9 | 18/500 |

The result shows that even with the space of 1 mm, the effect of reducing microscopic short circuit was recognized. With the space of 3 mm, microscopic short circuit could never be recognized after 500 charge/discharge cycles and all the 500 cells could show good charge and discharge performances. The reason is considered as follows. As aforementioned, since the space of 3 mm was almost disappeared after the 500 cycles of the charge and discharge, as a result of the absorption of the extension of the electrode plates with the progress of charge/discharge cycles, a partial deformation of the spirally-rolled electrodes was alleviated. Therefore, although the same effect can be expected even with the space of over 3 mm, since the battery capacity lowers with the expansion of the space, the spaces of around 5 mm or less is preferable.

In this Example, such an example was shown as comprising two positive electrode plates_but except for some complicated problems, the more the number of the plates, the less variation can be achieved. Also, the deformation of the spirally-rolled electrodes group can be reduced. The same thing can be said about the negative electrode, that is, the more the sheet number, the further less variation.

Further, it is preferable to make electrode plates at the part of the start of winding thinner than electrode plates at the part of the end, because of preventing a small curvature radius part from cracking and facilitating the winding with a concentric circle shape.

Here, when such constructing method of the electrodes is employed as in this Example of the present invention, there is no need to provide the large extra capacity in the negative electrode to keep the capacity balance between the positive and negative electrodes in the sealed battery, thereby making some spaces, which, as a consequence, enables to increase the battery capacity.

In this Example, although the positive electrode is a foamed nickel type, any type electrode such as another paste-type employing three dimensional metal substrate with numerous concavities and convexities, and sintered-type electrodes can be available.

Further, from the similar theoretical viewpoint of the present Example, the effect of reducing the distribution of the battery capacity can be applied to the Li-ion batteries which already use the positive and negative electrode of furthermore thinner and longer electrode. It is considered that the space provided between the electrode plates has more effects in reducing the deformation of the spirally-rolled electrodes.

Example 2

By filling the paste prepared by the preparation example in the foamed nickel porous material on the market with nickel lead welded beforehand and then by conducting press work after drying the paste, several sheets of positive electrode plates with the thickness of 0.4 mm, the width of 40 mm and the length of 75 mm as shown in the FIG. 3(b) were obtained.

Subsequently, all the weights of the positive electrode plates were measured and classified into 8 steps by weight, thereby obtaining the positive electrode for batteries by selecting 2 plates so that the value might be close to the average weight value.

The electrodes group as shown in FIG. 1 was constructed by making the positive electrode and a sheet of hydrogen absorbing alloy negative electrode with the thickness of 0.25 mm, width of 40 mm, and the length of 200 mm using the generally used $MmNi_5$-type alloy powder. At the time of winding, as shown in y in the FIG. 2, two plates for positive electrode were constructed spirally with the space of 3 mm. Here, in the FIG. 2, as for negative electrode shows that negative electrode also comprises the two electrode plates, and in the present Example 2, one negative electrode was used.

This electrodes group was inserted in the AA-size case manufactured in the production example 2, and then about 30 wt % of KOH solution is poured into the case which is then sealed, thereby preparing the AA-size sealed cylindrical Ni/MH batteries as shown in FIG. 1. As in Example 1, the capacity variation among batteries was kept very low. As a result, the battery capacity with 500 cells can be limited to within the range of ±1.5%. The effect of preventing the micro short circuit can also be recognized. In this effect, it is more complete that, at least, each edge of the plate in winding direction is wrapped by a strip of separator or covered by a resin film.

Here, when the positive electrode comprises further more positive electrode plates and when the negative electrode comprises several negative electrode plates, despite its complexity, the same effect as in the Example 1 could be achieved in that the battery capacity with less distribution could be obtained and the deformation of the spirally-rolled electrodes could be reduced.

As mentioned above, according to the present invention, Ni/MH batteries providing the spirally-rolled electrodes are capable of keeping the battery capacity distribution between numerous batteries extremely narrow, and as a result, increasing the average capacity as well as preventing the micro short circuit are caused by repeated cycles of charge and discharge. Therefore, the present invention is capable of providing the light-weighted secondary batteries suitable for power use including hybrid electric vehicles(HEVs) or electric-assisted bicycles, which require many batteries in series.

The present application claims priority of Japanese application No. 2000-327215, the disclosures of which are incorporated herein by reference. While a detailed description of the invention has been provided above, the present invention is not limited thereto and various modifications will be apparent to those of skill in the art. The invention is defined by the claims that follow

The invention claimed is:

1. Spirally-rolled electrodes for batteries having a concentric circle shape or an elliptic shape with positive electrodes, negative electrodes and a separator therebetween, wherein;
    said positive electrode and said negative electrode each comprise combinations of plural electrode plates each of the plates having a substantially constant total amount of active or pseudo-active material, and each of the plates has a weight where the sum of the weights of the plates is ±1% of an average weight of the combination of plural electrode plates, whereby differences in said positive and negative electrode capacities are minimized; and each electrode plate in said positive electrode and negative electrode is wound in series with an interval therebetween; wherein each of the electrode plates has at least two chamfered corners.

2. Spirally-rolled electrodes for batteries as set forth in claim 1, wherein each of the plural electrode plates comprising said positive electrode and/or negative electrode has a lead terminal or a terminal equivalent to a lead terminal respectively.

3. Spirally-rolled electrodes for batteries as set forth in claim 1, wherein each of the plural electrode plates comprising at least in said positive electrode has a metal foil without active materials along the edge of one side in the winding direction and said metal foil is exposed over a separator.

4. A secondary battery wherein spirally-rolled electrodes are sealed having a concentric circle shape or an elliptic shape with a positive electrode and a negative electrode which are wound spirally interposing a separator therebetween has the structure as below:

said positive electrode and negative electrode each comprise combinations of plural electrode plates each of the plates having a substantially constant total amount of active or pseudo-active material, and each of the plates has a weight where the sum of the weights of the plates is ±1% of to an average weight of the combination of plural electrode plates, whereby differences in said positive and negative electrode capacities are minimized; and each electrode plate in said positive electrode and negative electrode is wound in series with an interval therebetween; wherein each of the electrode plates has at least two chamfered corners.

5. A secondary battery as set forth in claim 4, wherein the thickness at the bottom of said battery case ($t_2$) is thick enough for welding the ratio ($t_2/t_1$) of the thickness at the bottom ($t_2$) to the thickness at the side wall ($t_1$) is not less than 1.5.

6. A secondary battery as set forth in claim 5, wherein thicker part is provided inside the battery case at the border of the side wall and the bottom of said battery case.

7. A secondary battery as set forth in claim 5, wherein the adjacent positive terminal of the secondary battery is welded directly or indirectly by a metallic connector to the bottom of the neighboring battery case.

8. Spirally-rolled electrodes for batteries as set forth in claim 1, wherein a surface area of each electrode plate is identical.

9. A secondary battery as set forth in claim 4, wherein a surface area of each electrode plate is identical.

* * * * *